United States Patent
Deibel et al.

[15] 3,644,957
[45] Feb. 29, 1972

[54] WINDSHIELD WIPER BLADE

[72] Inventors: Raymond A. Deibel, West Falls; William C. Riester, Williamsville, both of N.Y.

[73] Assignee: Trico Products Corporation, Buffalo, N.Y.

[22] Filed: May 20, 1970

[21] Appl. No.: 39,010

[52] U.S. Cl. .................................................. 15/250.42
[51] Int. Cl. ............................................................ B60s 1/38
[58] Field of Search ..................... 15/250.32, 250.36, 250.42

[56] References Cited

UNITED STATES PATENTS

| 2,876,482 | 3/1959 | Oishei | 15/250.42 |
| 2,727,271 | 12/1955 | Oishei et al. | 15/250.42 |
| 2,728,100 | 12/1955 | Oishei | 15/250.42 |

FOREIGN PATENTS OR APPLICATIONS

| 1,414,690 | 9/1965 | France | 15/250.32 |
| 269,666 | 3/1969 | Austria | 15/250.42 |

Primary Examiner—Peter Feldman
Attorney—E. Herbert Liss

[57] ABSTRACT

A windshield wiper blade includes a pressure-distributing frame having a series of levers arranged in partially overlapping relationship flexibly connected together; a lower articulating frame member retained by claws disposed at the free ends of adjacent lever members retains a rubber flexible blade interlocked with a blade-receiving seat in the lower frame member. Primarily for cold weather use the frame is enclosed by a rubber weather-protecting hood interlocked with the lower frame member and the rubber blade. An arm-attaching element is secured to the upper side. The lever members are connected together with a plastic or other nonmetallic substantially cylindrically shaped connector; the connector includes annular grooves adjacent each end which form a head at each end and a spacing flange intermediate the ends. The annular groove at one end of the connector is received in a keyhole slot adjacent an end of the lever. The annular groove at the other end is slidably received in a keyhole slot formed intermediate the ends of an adjacent lever, the levers thus being spaced apart at their points of connection by the intermediate flange of the connector element.

3 Claims, 5 Drawing Figures

Patented Feb. 29, 1972
3,644,957
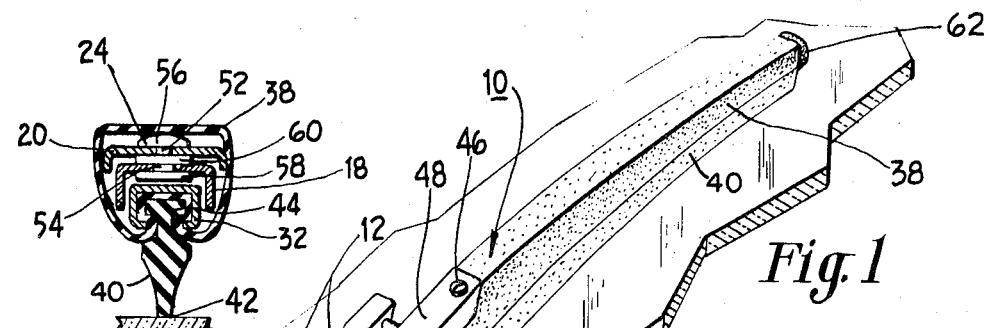
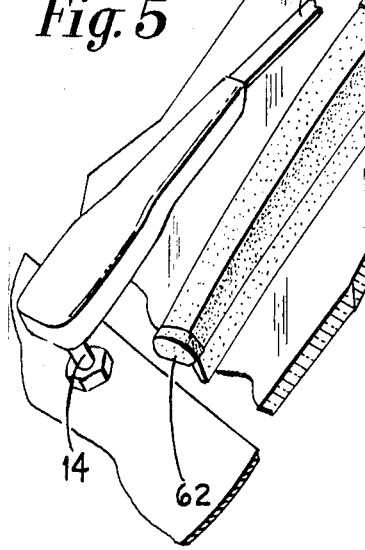
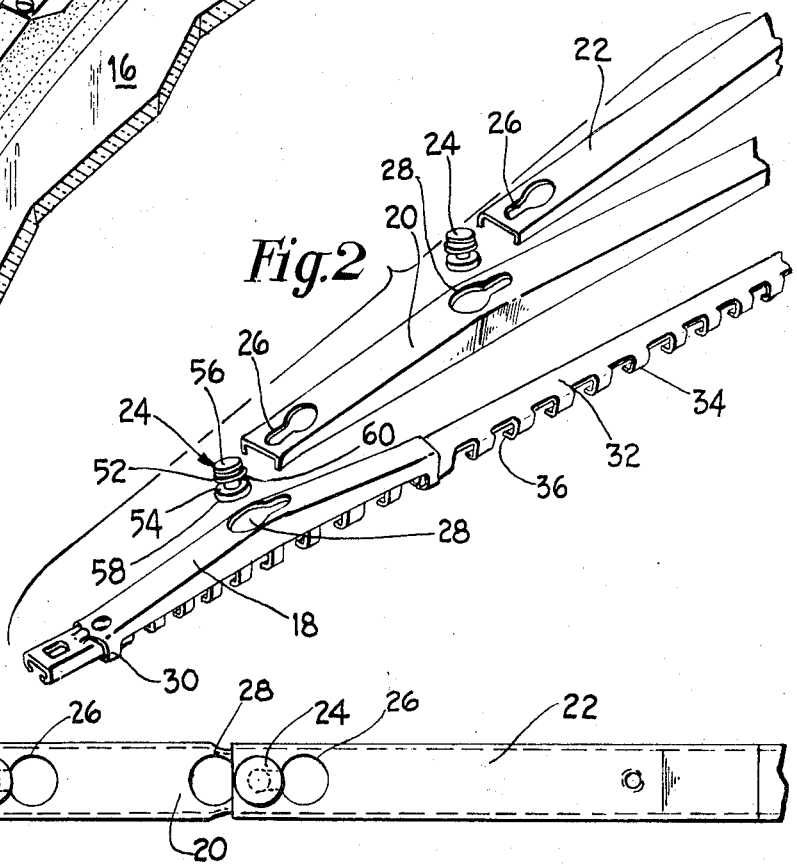
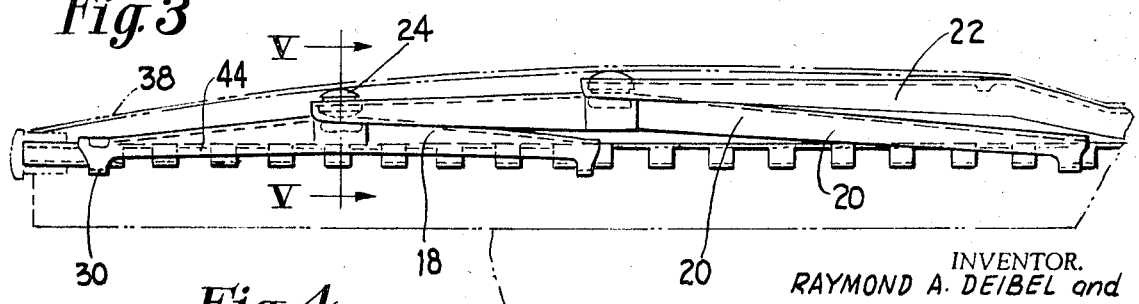
INVENTOR.
RAYMOND A. DEIBEL and
WILLIAM C. RIESTER
BY
E. Herbert Liss
ATTORNEY.

WINDSHIELD WIPER BLADE

BACKGROUND OF THE INVENTION

The invention relates to a windshield wiper assembly for cleaning curved windshields and more particularly to a wiper blade assembly for use under snow and icing conditions.

This invention is an improvement over the snow blades disclosed in U.S. Pat. No. 2,727,271 by J. R. Oishei, et al., issued Dec. 20, 1955 and U.S. Pat. No. 2,728,100 by J. R. Oishei, issued Dec. 27, 1955.

The prior art blade assemblies include connecting means for joining levers which result in lever-to-lever contact at the flexible connections between the lever elements. These points of connection under certain extreme conditions form regions where entrance of of moisture (including condensation) and subsequent freezing may impair the efficiency of blade operation by interfering with the flexibility of the pressure-distributing frame. Furthermore, since the lever members are usually formed of metal, wear takes place in these regions. This may also be a source of noise.

SUMMARY

With the present invention elimination of ice at the joints between the levers, elimination of noise, elimination of the possibility of corrosion at these points and simplified assembly are achieved.

These results are accomplished by utilizing a connector, preferably of plastic material, for securing the end of one lever to a point intermediate the ends of an adjacent lever. The connector is constructed so as to space the levers a sufficient distance one from the other at the joints between the levers to obviate their being a repository for moisture. An interlocking assembly means is provided to facilitate rapid assembly without the use of special machines.

The principal object of the present invention is to provide an improved wiper blade assembly which eliminates contact between the levers at the point of connection, thereby minimizing noise, corrosion and interference with flexibility of the assembly due to icing.

Another object of the invention is to provide an improved wiper blade construction which facilitates assembly by providing interlocking connecting elements between the levers.

Other objects and advantages of the invention will be apparent from the following detailed description taken in connection with the accompanying drawings.

DESCRIPTION OF THE DRAWINGS

FIG. 1 is a fragmentary perspective view of a vehicle windshield with the wiper blade of the invention mounted thereon.

FIG. 2 is a fragmentary exploded perspective view of the wiper blade assembly of the invention with the hood removed.

FIG. 3 is a fragmentary top elevational view of the wiper blade assembly with the hood removed.

FIG. 4 is a fragmentary side elevational view.

FIG. 5 is a transverse section taken on line V—V of FIG. 4.

Referring more particularly to the accompanying drawings, a wiper blade 10 is shown secured to a wiper arm 12 for movement therewith in an arcuate path across a windshield 16. The wiper arm 12 is secured to a pivot shaft 14 mounted on the cowl of a vehicle at the lower edge of the windshield 16 for oscillatory movement in a well-known manner.

The wiper blade 10 includes a flexible pressure-distributing frame comprising a plurality of elongate lever members 18, 20 and 22 arranged in partially overlapping relationship and flexibly connected together with the end of one lever connected to a portion intermediate the ends of an adjacent lever by a connector 24, interlocking keyhole slots 26 at the end of the levers 20 and 22, and interlocking keyhole slots 28 intermediate the ends of the levers 18 and 20. Claws 30 at the free ends of the levers 18 and 20 embrace a flexible lower frame member 32 which constitutes a backing strip or vertebra. The lever 22 extends longitudinally of the blade and similarly may engage levers 18 and 22 (not shown) at the other end of the pressure-distributing frame. The vertebra 32 includes a downwardly extending interrupted flange 34 on each side thereof, flange 34 having an inwardly extending flange 36 at the free end thereof. Thus the vertebra or backing strip 32 is substantially U-shaped in cross section, forming a seat for interlockingly receiving a weather hood 38 and flexible blade 40 of rubber or rubberlike material. The hood 38 may be of tubular shape and encloses a flexible frame. A portion thereof lies within the seat formed by the backing strip 32. The flexible blade 40 includes a wiping edge 42 and an anchoring bead 44 extending longitudinally along its entire length. The anchoring bead 44 interlockingly engages the seat or bite of the lower frame member 32, thereby retaining the hood 38 in position. At the top side of the upper frame member 22, secured in any suitable or desirable manner as, for example, by screws 46, is an arm attaching connector 48 which receives a cooperating connector 50 secured to the arm 12.

The connector 24 may be of plastic or other metallic or nonmetallic, moisture-resistant material. It is substantially cylindrical in shape and includes annular grooves 52 and 54 adjacent its upper and lower ends respectively, forming heads 56 and 58 at each end and an annular flange or spacer 60 intermediate the ends. The annular groove 52 adjacent the upper end of the connector 24 is interlockingly received in a slot 26 adjacent one end of a lever member 20 or 22 in close frictional engagement. The annular groove 54 adjacent the lower end of the connector 24 is received in a keyhole slot 28 of a lever 18 or 20. The positions of the keyhole slots 28 and 26 and the dimensions of the levers are such that when the blade is fully assembled the levers can be separated only by intentional manual manipulation. The lower annular groove 54 is of sufficient width to provide fulcrum points for the levers 18, 20 and 22. When the blade is fully assembled the annular grooves 54 of the connectors 24 are slidable in the narrow retaining portion of the keyhole slots 28 to permit noiseless flexing of the pressure-distributing frame. The narrow retaining portions of the keyhole slots 26 are dimensioned so that there is a tight frictional fit with annular grooves 52 of connectors 24. The connectors 24, being of plastic material, minimize the friction at the joints. The interlocking relationship between the connectors 24 and the levers 18, 20 and 22 permit simplified, rapid, manual assembly. End caps 62 may be provided at each end of the weather hood 38 to completely enclose the pressure-distributing frame to minimize entrance of snow and moisture.

It should now be apparent that an improved snow blade, suitable for wiping curved windshields, has been provided which permits simple and rapid assembly, provides spacing between the levers at the joints to eliminate icing, resists corrosion and which provides low-friction, noise-free fulcrum points. A certain specific embodiment of the invention has been shown and described for the purpose of illustration, but it will be apparent that various modifications and other embodiments are possible within the scope of the invention. For example, the invention may be utilized with other and different types of blades haVing other and different types of lever arrangements. The connectors may take various and diverse shapes and forms within the general concept of the invention. It is, therefore, understood that the invention is not limited to the specific arrangement shown but in its broadest aspect it includes all equivalent embodiments and modifications which come within the scope of the invention.

What is claimed is:

1. A windshield wiper blade assembly comprising an articulated pressure-distributing frame including a plurality of elongate lever members arranged in partially overlapping relation to each other, a connecting member flexibly securing an end of one lever member to an intermediate portion of an adjacent lever member, said connecting member comprising a substantially cylindrical element of moisture-resistant plastic material having an enlarged head at each end, an annular spacer flange intermediate said enlarged heads forming annular grooves between each enlarged head and said annular spacer flange, one of said annular grooves being interlockingly engaged with a slot adjacent an end of one of said elongate lever members, an adjacent lever member having a keyhole slot intermediate its ends, said keyhole slot comprising an opening of larger size than said enlarged heads terminating in an elongated slot of narrower width than said enlarged heads, the enlarged head adjacent the other of said annular grooves being insertable in said opening, the other annular grooves being interlockingly and slidably engaged in said elongated slot when the blade is in assembled condition.

2. A windshield wiper blade assembly according to claim 1 wherein said pressure-distributing frame includes an arm-attaching construction on its upper side and a lower frame member haVing a flexible blade interlocked therewith.

3. A windshield wiper blade assembly according to claim 2 including a weather hood enclosing the pressure-distributing frame, said frame having parts thereof interlockingly engaging the hood to anchor it to the frame.

* * * * *